United States Patent [19]

Corsetti et al.

[11] Patent Number: 5,267,290
[45] Date of Patent: Nov. 30, 1993

[54] ZIRCONIUM ALLOY ABSORBER LAYER

[75] Inventors: Lawrence V. Corsetti, Granby; Satya R. Pati, Simsbury, both of Conn.

[73] Assignee: Combustion Engineering, Inc., Windsor, Conn.

[21] Appl. No.: 906,379

[22] Filed: Jun. 30, 1992

[51] Int. Cl.$^5$ .............................. G21C 3/00
[52] U.S. Cl. .................. 376/419; 376/339; 376/416
[58] Field of Search .......... 376/419, 416, 414, 339; 976/DIG. 53, DIG. 116, DIG. 117

[56] References Cited

U.S. PATENT DOCUMENTS

| | | | |
|---|---|---|---|
| 3,205,139 | 9/1965 | Stewart et al. | 376/419 |
| 4,675,153 | 6/1987 | Boyle et al. | 376/416 |
| 4,863,679 | 9/1989 | Imahashi et al. | 376/417 |
| 4,894,203 | 1/1990 | Adamson | 376/416 |
| 5,075,075 | 12/1991 | Kapil | 376/419 |
| 5,087,301 | 2/1992 | Angers et al. | 148/12.7 |
| 5,147,598 | 9/1992 | Kapil | 376/419 |

OTHER PUBLICATIONS

A Guide to Nuclear Power Technology, pp. 429-438, (1984).
Metallurgical Progress Report, No. 3, pp. 33-38 (1959).
Neutron Absorber Materials for Reactor Control, pp. 608-609, (1962).
Development of High Corrosion Resistance Zirconium-Base Alloys, Nov. 1990.

*Primary Examiner*—Donald P. Walsh
*Assistant Examiner*—Meena Chelliah
*Attorney, Agent, or Firm*—Ronald P. Kananen; John H. Mulholland

[57] ABSTRACT

A burnable-absorber-containing zirconium alloy is described for application to the inside surface of cladding tubes for light water nuclear reactors. The alloy comprises naturally occurring erbium in a range from a measurable amount up to about 20 wt. % or isotopically purified erbium-167 in a range from a measurable amount up to about 5 wt. %; tin in a range from a measurable amount up to about 0.5 wt. %; iron in a range from a measurable amount up to about 0.2 wt. %; chromium in a range from a measurable amount up to about 0.1 wt. %; niobium in a range from a measurable amount up to about 0.1 wt. %; silicon in a range from about 50 to about 120 parts per million ("ppm"); oxygen in a range from a measurable amount up to about 800 ppm; and the balance zirconium. Such an alloy provides an effective absorber material for reactor control, while providing adequate mechanical properties and corrosion resistance for the intended application.

9 Claims, No Drawings

ZIRCONIUM ALLOY ABSORBER LAYER

FIELD OF THE INVENTION

This invention relates to a burnable-poison containing zirconium alloy for use in light water nuclear reactors (LWR's). More particularly, this invention relates to a layer of a zirconium alloy absorber material which is metallurgically bonded on the inside surface of a fuel rod cladding tube for use in LWR's. Still more particularly, this invention relates to an erbium containing zirconium alloy layer for use in LWR cladding tubes.

BACKGROUND OF THE INVENTION

General background materials on fuel rods, claddings and absorber materials are available. See, e.g., Frank J. Rahn et al., *A Guide to Nuclear Power Technology*, pp. 429–438 (1984).

In light water reactor (LWR) designs, fuel is formed into oxide pellets, which consist of uranium oxide or mixed uranium/plutonium oxide. These pellets are then placed in long tubes called cladding tubes to form fuel rods. The cladding tube forms a barrier against radioactive fission products released in the fuel pellets during irradiation. Proper fuel design requires an economical fuel cycle, while providing the necessary fuel characteristics for safe plant operation. Thus structural materials must be selected that have low neutron cross-section and low cost, while providing adequate mechanical and corrosion resistance characteristics. Fuel assembly design should accordingly allow for the operation of the reactor at the design power and for the highest possible burn-up without breaching the cladding and releasing radioactive products to the primary coolant.

Zirconium alloys are used in fuel designs because they combine desirable nuclear, physical and mechanical properties. Because nuclear-grade zirconium is expensive, its alloys are used only in the active zone of the nuclear core where its neutron economy is most advantageous. Zircaloy-2 and Zircaloy-4 are two slightly different alloys which were developed for nuclear applications. Zircaloy-2 typically contains about 1.4 wt. % tin, 0.15 wt. % iron, 0.1 wt. % chromium and 0.06 wt. % nickel, 1,000 ppm oxygen and the balance zirconium. Zircaloy-4 typically contains about 1.4 wt. % tin, 0.21 wt. % iron, 0.11 wt. % chromium, 30 ppm nickel, 1,200 ppm oxygen and the balance zirconium. Zircaloy-2 has a small content of nickel, while in Zircaloy-4 the nickel content is essentially replaced by iron. This small change in composition reduces the hydrogen absorption rate during service in high-temperature water. The physical and mechanical properties of the two alloys are nearly identical. Pressurized water reactor (PWR) fuel rods are typically made with Zircaloy-4 cladding, while boiling water reactor (BWR) fuel rods utilize Zircaloy-2.

Continuous operation of a reactor requires that the core remain critical. However, to compensate for the gradual depletion of fissile material with time, as burn-up accumulates, and to compensate for other phenomena such as the buildup of fission products, excess reactivity must be built into the nuclear core. This excess reactivity must be controlled at any given time to keep the reactor critical for steady-state operation. This task is accomplished by the use of materials that are strong neutron absorbers or "poisons." Control elements constructed from neutron absorbers regulate power generation according to demand and provide quick shutdown.

The foremost characteristic of a control material is its neutron absorption properties. These vary with the energy of the impinging neutrons but one can gather together the detailed absorption features into a "thermal absorption cross-section," which is of interest in LWR's. The dominant absorber used in control rods in LWR's is boron.

In addition to the movable control rods used in all LWR's, present LWR designs utilize burnable poisons. These are solid neutron absorbers which are placed in the reactor. As it is subjected to neutron irradiation, the burnable absorber material is gradually depleted. Thus the depletion of the burnable poison corresponds, roughly, to the depletion of fissile material. Burnable-poisons are used to counterbalance excess reactivity at the beginning of the fuel cycle and to provide a means for power shaping and optimum core burn-up. Burnable poison compounds currently of interest include boron, gadolinium and erbium.

Many LWR fuel designs employ burnable absorber rods to control axial power peaking or moderator temperature coefficient in a number of ways. In some designs, burnable absorber rods are placed in fuel assembly lattice locations, thereby displacing fuel rods. Other designs employ burnable absorber rod inserts in fuel assembly guide thimbles. Still other designs involve the formation of burnable-absorber coatings on the inside diameters of cladding tubes, on fuel pellet surfaces, or involve distribution of the burnable absorber within the fuel pellet.

The use of a burnable-poison which is disposed on the inside surface of the fuel cladding tube has several advantages. For example, such a configuration can be used with uranium dioxide fuel pellets provided inside the cladding so that the fuel rod produces as much (or almost as much) power as a regular fuel rod.

Moreover, the burnable-poison can be applied to the cladding tube prior to the introduction of the uranium dioxide pellets into the tube, allowing the burnable-poison to be applied to the cladding in a cold (non-nuclear) area.

Furthermore, when the burnable poison is applied to the inside of the fuel cladding tubes, it is relatively easy to adjust the axial gradient of the burnable poison. This provides an advantage over associated methods which involve putting burnable poison on the pellet and mixing pellet types.

Finally, the use of cladding tubes having a burnable-poison layer provides for improved quality control. For example, the burnable-poison coating depth can be accurately determined by bombarding the tubing with neutrons and measuring the fraction of the neutrons which are not absorbed by the burnable absorber.

One problem facing LWR fuel designers is the possibility of rod failure due to rapid changes in rod power. Boiling water reactor (BWR) designers have elected to introduce a soft layer of metal between the cladding ID and the fuel pellet as a means to increase the resistance to rod failure. For example, the General Electric Company has provided a layer of crystal bar zirconium between the cladding tube and fuel pellet in fuel rods. However, since this layer is basically composed of pure zirconium it unfortunately exhibits poor corrosion resistance. Moreover, this layer does not contribute to the control of axial power peaking or moderator temperature coefficient.

Accordingly, there is a continuing need in the art to provide an easily manufactured cladding tube having a burnable-poison-containing material provided on its inside surface which provides resistance to fuel rod failure, while displaying adequate corrosion resistance.

SUMMARY OF THE INVENTION

In view of the foregoing, it is an object of the present invention to incorporate a burnable poison material in a layer which is metallurgically bonded to the inside surface of a fuel rod cladding tube.

It is a further object of the present invention to provide an alloy layer consisting of zirconium and a burnable poison material. Small amounts of additional alloying materials, such as tin, iron, chromium, niobium and silicon, are added to improve corrosion resistance.

It is yet another object of the present invention to provide a zirconium alloy absorber layer with mechanical properties which allow the layer to be provided on the inside diameter of a cladding tube through a co-extrusion fabrication process.

It is a further object of the present invention to provide a zirconium alloy absorber layer with improved resistance to fuel rod failure arising from rapid changes in rod power. Such power changes result in pellet-cladding interaction (PCI) which contributes to subsequent stress corrosion cracking.

It is still another object of the present invention to provide a zirconium alloy absorber layer which exhibits improved corrosion resistance relative to a pure zirconium layer. This corrosion resistance will provide additional protection in the event of fuel rod failure.

The present invention thus provides for the fabrication of a zirconium alloy cladding tube having a layer of zirconium-erbium alloy on its inside surface in a thickness of about $0.003 \pm 0.001$ inches. This layer contains up to 20 weight percent ("wt. %") naturally occurring erbium or up to 5 wt. % isotopically enriched erbium-167, depending on the given burnable poison requirement for the intended application. Additional alloying elements are added to improve corrosion performance. Thus, the composition of a zirconium-erbium alloy, according to an embodiment of the present invention, can comprise naturally occurring erbium in a range from a measurable amount up to about 20 wt. % or isotopically purified erbium-167 in a range from a measurable amount up to about 5 wt. %; tin in a range from a measurable amount up to about 0.5 wt. %; iron in a range from a measurable amount up to about 0.2 wt. %; chromium in a range from a measurable amount up to about 0.1 wt. %; niobium in a range from a measurable amount up to about 0.1 wt. %; silicon in a range from about 50 to about 120 parts per million ("ppm"); oxygen in a range from a measurable amount up to about 800 ppm; and the balance zirconium.

DESCRIPTION OF THE PREFERRED EMBODIMENTS

Alloy composition is a critical feature of the zirconium alloy absorber material of the present invention. For example, the alloy composition is selected to provide adequate mechanical properties for fabrication, allowing a zirconium alloy absorber material to be provided on the inside diameter of a zirconium alloy cladding tube using a standard co-extrusion fabrication process. The alloy composition is also chosen to provide an adequate concentration of burnable absorber material to control reactivity, axial power peaking and moderator temperature coefficient. Thus, according to an embodiment of the present invention, naturally occurring erbium is added to the zirconium alloy in an amount up to about 20 wt. %. Alternatively, isotopically enriched erbium-167 is added in an amount up to about 5 wt. %. Moreover, the alloy composition is chosen to provide a soft layer of metal between the cladding tube and fuel pellet to reduce stress corrosion resulting from PCI and thus, to increase the resistance to fuel rod failure. This means that alloying agents which tend to harden the alloy composition are held to a minimum. Finally, the alloy composition is chosen to improve corrosion resistance which will provide protection in the event of fuel rod failure. This requires the addition of specific alloying agents as discussed below.

Alloys similar in composition have also shown good corrosion resistance in out-of-reactor autoclave tests. Isobe, T., and Matsuo, Y., "Development Of The High Corrosion Resistance Zirconium-Base Alloys", paper presented at the 9th International Symposium on Zirconium in The Nuclear Industry, Nov. 5-8, 1990, Kobe, Japan, ASTM STP 1123 (1991).

The present invention relates to the fabrication and use of zirconium alloy structural components in LWR's which preferably contain isotopically purified erbium-167 as a constituent. Erbium has been under consideration as a burnable absorber because it has been found, by calculation, to have certain advantages over other burnable absorbers such as boron and gadolinium. Very recent reactor test results using uranium dioxide fuel with erbium included in the fuel pellets have supported these calculations. In its naturally occurring state, erbium contains several distinct isotopes. Each of these isotopes has a different thermal neutron capture cross-section. Thus, the effectiveness of the burnable absorber can be increased by isolating those burnable absorber isotopes, such as erbium-167, having a high absorption cross-section.

Specific methods are available for removal of a single isotope from an isotopic mixture. For example, desirable isotopes may be isolated by fractionation of the material using commonly known techniques such as gas diffusion, centrifugal separation, or liquid chromatography. Another method is atomic vapor laser isotope separation (AVLIS). AVLIS was developed for large scale uranium enrichment applications at the Lawrence Livermore National laboratory. AVLIS works by first heating and vaporizing a sample of interest followed by laser irradiation at a wavelength specifically selected to ionize only the selected isotope. Once ionized, the isotope is isolated using electric fields.

Erbium, which has been isotopically depleted in the 166 isotope, and gadolinium, which has been isotopically depleted in the 156 isotope, were recently disclosed by Grossman et al. as favored additives for uranium dioxide fuel pellets in co-pending U.S. Ser. No. 07/761,438.

The alloy of the present invention therefore includes natural erbium in a range of from a measurable amount up to about 20 wt. % or isotopically enriched erbium-167 in a range from a measurable amount up to about 5 wt. %. These concentrations are primarily based on the projected need for burnable poisons to satisfy LWR requirements. Such requirements include the control of reactivity, axial power peaking and moderator temperature coefficient.

The upper limit of about 20 wt. % in case of naturally occurring erbium is also dictated by consideration of second-phase formation, which will have an adverse impact on ductility and fabricability. Erbium-zirconium phase diagrams indicate a high degree of erbium solubility in zirconium (i.e., up to about 20 wt. % erbium) without the formation of a second phase over the range of processing temperatures normally employed to fabricate Zircaloy tubing. United States Department of the Interior Bureau of Mines, Region I, *Metallurgical Progress Report.* No. 3, pp. 33-38 (1959). While some hardening of the zirconium layer is expected, available data is sparse on this particular property. However, given the range of operating temperatures experienced in a PWR, any additional embrittlement due to irradiation effects is expected to be small since defects would be continuously "annealed" out during operation.

Although the corrosion behavior of zirconium alloys containing such high levels of erbium is not known, the addition of up to 1 wt. % dysprosium, a rare-earth element like erbium, has not demonstrated any adverse corrosion effects. Anderson, W. K. and Theilacker, J. S., Eds., *Neutron Absorber Materials For Reactor Control*, Naval Reactors, Division of Reactor Development, United States Atomic Energy Commission, pp. 608-609 (1962). Moreover, additions of tin, iron, niobium and silicon are expected to counterbalance any potential detrimental corrosion effects arising from the erbium addition. As a result of the combined influences of these alloying elements, the corrosion behavior of the absorber material of the present invention which contains erbium in a range up to about 20 wt. % is expected to be as good as, if not superior to, that of the crystal bar zirconium layer used between the cladding tube and the fuel pellets by the General Electric Company.

Furthermore, the use of isotopically enriched erbium-167 isotope, as opposed to naturally occurring erbium, allows the amount of absorber material to be limited to less than about 5 wt. %, while maintaining reactivity hold-down characteristics equivalent to that obtained with naturally occurring erbium additions of up to about 20 wt. %. Mole per mole, the corrosion and second phase behavior of the isotopically enriched erbium-167 is not expected to substantially differ from that of naturally occurring erbium. Thus, any potential adverse effects which may arise from the addition of naturally occurring erbium will be minimized by the substitution of isotopically enriched erbium-167.

The alloys of the present invention also contain tin in an amount ranging from a measurable amount up to about 0.5 wt. %. Zirconium-based alloys containing 0.5 wt. % tin show superior corrosion resistance when compared to either pure zirconium or commercial Zircaloys which contain a minimum of 1.2 wt. % tin. Isobe et al., supra. A reduction in tin content from levels found in conventional zircaloys also lowers mechanical strength. This is an attractive property for the application of the present invention, since a softer material generally provides a more effective barrier for resisting PCI-induced stress corrosion cracking of fuel rods.

The alloy of the present invention also contains iron in a range from a measurable amount up to about 0.2 wt. %, chromium in a range from a measurable amount up to about 0.1 wt. %, and niobium in a range from a measurable amount up to about 0.1 wt. %. These elements are provided in their respective ranges based on their ability to improve the corrosion resistance of zirconium-based alloys. For example, zirconium-based alloys containing 0.5 wt. % tin, 0.2 wt. % iron and 0.1 wt. % chromium have demonstrated corrosion resistance in autoclave tests which is superior to that of commercial grades of Zircaloy-4, and the addition of niobium in the specified range has been shown to provide further improvement in corrosion resistance. Isobe et al., supra.

Another feature of this invention is that silicon is deliberately added in a range of from about 50 to 120 ppm and is used as an alloying agent to improve corrosion resistance. In contrast, silicon is typically considered as an impurity in prior art zirconium alloys. For example, only an upper limit for silicon is specified in the ASTM specifications for Zircaloy-2 and Zircaloy-4. Autoclave tests performed on zirconium materials containing less than 50 ppm silicon have shown poorer corrosion resistance than materials containing higher levels of silicon.

The alloy of the present invention also contains oxygen in a range from a measurable amount up to 800 ppm. Oxygen acts as a solid solution strengthening agent in zirconium alloys, and a lower range of oxygen than is customarily used in commercial Zircaloys (1,000 to 1,500 ppm) has been selected to maintain the softness of the zirconium alloy absorber material layer.

A layer of the alloy of the present invention can easily be applied to the inside surface of a conventional zirconium alloy, such as Zircaloy-2 or Zircaloy-4, by means of standard co-extrusion process. Based on typical needs for LWR reactors, this layer is between about 0.002 and 0.004 inches, and preferably 0.003 inches in thickness.

Thus, the burnable-poison containing alloy of the present invention provides an adequate concentration of burnable-absorber material to control reactivity, axial power peaking and moderator temperature coefficient, provides a soft layer of metal between the cladding tube and the fuel pellet to increase resistance to fuel rod failure, provides adequate corrosion resistance for typical applications, and provides adequate mechanical properties for fabrication using a standard coextrusion fabrication process.

TABLE I

| PREFERRED EMBODIMENTS OF ZIRCONIUM ALLOY ABSORBER MATERIALS | | |
|---|---|---|
| Erbium, wt % (naturally occurring) | $\leq 20$ | |
| Erbium-167, wt % (isotopically enriched) | | $\leq 0.5$ |
| Tin, wt % | $\leq 0.5$ | $\leq 0.5$ |
| Iron, wt % | $\leq 0.2$ | $\leq 0.2$ |
| Chromium, wt % | $\leq 0.1$ | $\leq 0.1$ |
| Niobium, wt % | $\leq 0.1$ | $\leq 0.1$ |
| Silicon, ppm | 50-120 | 50-120 |
| Oxygen, ppm | $\leq 800$ | $\leq 800$ |
| Zirconium | Balance | Balance |

We claim:
1. A zirconium alloy absorber material comprising:
a burnable absorber selected from the group consisting of naturally occurring erbium in a range of from >0 to 20 wt. % and isotopically enriched erbium-167 in a range from >0 to about 5 wt. %;
tin in a range of from >0 up to about 0.5 wt. %;
iron in a range of from >0 up to about 0.2 wt. %;
chromium in a range of from >0 up to about 0.1 wt. %;
niobium in a range of from >0 up to about 0.1 wt. %;
silicon in a range of from about 50 to about 120 ppm;

oxygen in a range of from >0 up to about 800 ppm; and a balance of zirconium.

2. A composite cladding tube construction comprising:

a zirconium alloy cladding tube and a layer of zirconium alloy absorber material disposed on the inner surface of the zirconium alloy cladding tube, the zirconium alloy absorber material comprising a burnable absorber selected from the group consisting of naturally occurring erbium in a range of from >0 up to about 20 wt. % and isotopically enriched erbium-167 in a range from >0 up to about 5 wt. %; tin in a range of from >0 up to about 0.5 wt. %; iron in a range of 0.2 wt. %, chromium in a from >0 up to about 0.2 wt. %, chromium in a range of from >0 up to about 0.1 wt. %, niobium in a range of from >0 up to about 0.1 wt. %, silicon in a range of from 50 to 120 ppm, oxygen in a range of from >0 up to about 800 ppm, and a balance of zirconium.

3. The composite cladding tube construction of claim 2, wherein the layer of zirconium alloy absorber material has a thickness ranging from about 0.0002 to about 0.004 inches.

4. The composite cladding tube construction of claim 2, wherein the zirconium alloy cladding tube is selected from the group consisting of Zircaloy-2 and Zircaloy-4.

5. A method for producing a composite cladding tube construction comprising the steps of:

providing a zirconium alloy;

providing a zirconium alloy absorber material comprising a burnable absorber selected from the group consisting of naturally occurring erbium in a range of from >0 up to about 20 wt. % and isotopically enriched erbium-167 in a range from >0 up to about 5 wt. %, tin in a range of from >0 up to about 0.5 wt. %, iron in a range of from >0 up to about 0.2 wt. %, chromium in a range of from >0 up to about 0.1 wt. %, niobium in a range of from >0 up to about 0.1 wt. %, silicon in a range of from about 50 to about 120 ppm, oxygen in a range of from >0 up to about 800 ppm, a balance of zirconium; and forming a cladding tube having an outer layer comprising the zirconium alloy and an inner layer on the cladding tube comprising the zirconium alloy absorber material.

6. The method for producing the composite cladding tube construction of claim 5, wherein the composite cladding tube construction is formed in a single process step.

7. The method for producing the composite cladding tube construction of claim 6, wherein the single process step comprises a co-extrusion process step.

8. The method for producing the composite cladding tube construction of claim 5, wherein the inner layer has a thickness ranging from 0.002 to 0.004 inches.

9. The method for producing the composite cladding tube construction of claim 5, wherein the zirconium alloy is selected from the group consisting of Zircaloy-2 and Zircaloy-4.

* * * * *